(12) United States Patent
Matsuzawa et al.

(10) Patent No.: US 9,008,478 B2
(45) Date of Patent: Apr. 14, 2015

(54) OPTICAL FIBER RIBBON, OPTICAL FIBER CABLE, AND WIRE CONFIGURATION, EACH HAVING IDENTIFICATION MARKING

(71) Applicant: Fujikura Ltd., Koto-ku, Tokyo (JP)

(72) Inventors: Takashi Matsuzawa, Sakura (JP); Yukiko Take, Chiba (JP); Mizuki Isaji, Chiba (JP); Ken Osato, Sakura (JP); Naoki Okada, Yotsukaido (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/644,939

(22) Filed: Oct. 4, 2012

(65) Prior Publication Data

US 2013/0028563 A1 Jan. 31, 2013

Related U.S. Application Data

(63) Continuation of application No. PCT/JP2011/058618, filed on Apr. 5, 2011.

(30) Foreign Application Priority Data

Apr. 5, 2010 (JP) .................................. 2010-086959

(51) Int. Cl.
*G02B 6/44* (2006.01)
*G02B 6/04* (2006.01)

(52) U.S. Cl.
CPC ............ *G02B 6/4482* (2013.01); *G02B 6/4403* (2013.01); *G02B 6/4411* (2013.01)

(58) Field of Classification Search
CPC .......................... G02B 6/4482; G02B 6/4403

USPC ................................................... 385/100–115
See application file for complete search history.

(56) References Cited

U.S. PATENT DOCUMENTS

| 5,379,363 | A | * | 1/1995 | Bonicel et al. ................. 385/114 |
| 5,796,905 | A | * | 8/1998 | Hoffart et al. ................. 385/128 |
| 6,321,012 | B1 | | 11/2001 | Shen |
| 6,381,390 | B1 | * | 4/2002 | Hutton et al. ................. 385/114 |
| 6,404,972 | B1 | | 6/2002 | Pasch et al. |
| 6,498,881 | B1 | * | 12/2002 | Thompson et al. ........... 385/114 |

FOREIGN PATENT DOCUMENTS

| JP | 11-513130 A | 11/1999 |
| JP | 2001-083382 A | 3/2001 |
| JP | 2003-255203 A | 9/2003 |

(Continued)

OTHER PUBLICATIONS

Australian Office Action dated Dec. 11, 2013, issued in counterpart Australian Patent Application No. 2011236888, "Patent Examiner Report No. 2.".

*Primary Examiner* — Mark Robinson
*Assistant Examiner* — Mary El Shammaa
(74) *Attorney, Agent, or Firm* — Sughrue Mion, PLLC (57) ABSTRACT

An optical fiber ribbon includes: a plurality of optical fibers arranged in parallel; and a tape material covering the plurality of optical fibers into a tape, in which the plurality of optical fibers are coated respectively with translucent color layers of different colors, and in at least two of the plurality of optical fibers, markings for identifying the optical fiber ribbon are provided at a same position in a longitudinal direction of the optical fiber ribbon.

2 Claims, 6 Drawing Sheets

(56) References Cited

FOREIGN PATENT DOCUMENTS

| | | | |
|---|---|---|---|
| JP | 2004-012680 A | 1/2004 | |
| JP | 2004-053989 A | 2/2004 | |
| JP | 2007-178883 A | 7/2007 | |

* cited by examiner

OPTICAL FIBER RIBBON, OPTICAL FIBER CABLE, AND WIRE CONFIGURATION, EACH HAVING IDENTIFICATION MARKING

CROSS-REFERENCE

This application is a Continuation of PCT Application No. PCT/JP2011/058618, filed on Apr. 5, 2011, and claims the priority of Japanese Patent Application No. 2010-086959, filed on Apr. 5, 2010, the content of both of which is incorporated herein by reference.

BACKGROUND OF THE INVENTION

1. Field of the Invention

The present invention relates to an optical fiber ribbon including a plurality of optical fibers which are joined in parallel and relates to an optical fiber cable and a wire configuration which include the optical fiber ribbons.

2. Description of the Related Art

As described in Japanese Patent Application Laid-open Publication No. 2007-178883, a conventionally proposed optical fiber ribbon includes a plurality of optical fibers which are joined in parallel. In such an optical fiber ribbon, the plurality of optical fibers, which are arranged in parallel, are coated with a tape material (a coating material). Each optical fiber includes a bare optical fiber coated with an ultraviolet curing resin. The bare optical fiber is composed of a core and a cladding. Such an optical fiber is also called as an optical fiber element.

In such an optical fiber ribbon, in order to identify each of optical fibers constituting the optical fiber ribbon, the surfaces of the optical fibers are individually colored in different colors. Otherwise, optical fibers constituting an optical fiber ribbon may be differently marked to be identified.

Alternatively, such optical fibers can be identified also by coloring or marking the surfaces of the coating materials coating the individual optical fibers.

Japanese Patent Application Laid-open Publication No. 2004-012680 describes a configuration in which the surfaces of optical fibers are colored by coating the surfaces of the optical fibers with transparent color layers.

SUMMARY OF THE INVENTION

Meanwhile, in the case of coloring the surfaces of the optical fibers of the aforementioned conventional optical fiber ribbon, the number of usable colors is limited, and accordingly, a limited number of optical fibers can be identified. Even if intermediate colors are used, it is not easy to determine such intermediate colors, and therefore identification of the optical fibers is difficult. Moreover, even if the optical fibers are identified by combinations of colors, such identification is also difficult. Furthermore, the colors of the optical fibers are identified through the tape material. This makes it difficult to provide good identification.

In the case of providing markings for the optical fibers, the markings could hide the colors of the optical fibers, thus degrading the identification by the colors of the optical fibers.

In the case of providing markings on the surfaces of the tape materials, the markings deteriorate over time due to the temperature, humidity, and the like, thus resulting in degradation of identification. Moreover, in such a case, when the tape material is removed to use the individual optical fibers, the markings are removed together with the tape material.

Furthermore, in the optical fiber ribbon, if the positions of the markings are distributed in the longitudinal direction, the combinations of the markings are difficult to distinguish, thus degrading the identification.

Accordingly, the present invention has been made in the light of the aforementioned circumference, and an object of the present invention is to provide an optical fiber ribbon including a plurality of optical fibers joined in parallel, the optical fiber ribbon allowing good identification of a number of types of optical fiber tape cores without degradation of identification due to deterioration over time and allowing identification of optical fibers when the tape material is removed to use the individual optical fibers and to provide an optical fiber cable including the aforementioned optical fiber ribbons, and a wire configuration.

An aspect of the invention is an optical fiber ribbon, including: a plurality of optical fibers arranged in parallel; and a tape material covering the plurality of optical fibers into a tape, in which the plurality of optical fibers are coated respectively with translucent color layers of different colors, and in at least two of the plurality of optical fibers, markings for identifying the optical fiber ribbon are provided at a same position in a longitudinal direction of the optical fiber ribbon.

A second aspect of the present invention is an optical fiber cable including: a plurality of optical fiber ribbons, in which each of the plurality of optical fiber ribbons includes: a plurality of optical fibers arranged in parallel; and a tape material covering the plurality of optical fibers into a tape. The plurality of optical fibers are coated respectively with translucent color layers of different colors, and the tape material is made of a colorless and transparent material. In at least two of the plurality of optical fibers, markings for identifying the optical fiber ribbon are provided at a same position in a longitudinal direction of the optical fiber ribbon. The markings of each optical fiber ribbon differ from those of any other one of the optical fiber ribbons.

A third aspect of the invention is a wire configuration of a plurality of optical fiber ribbons including a plurality of optical fiber ribbons, in which each of the plurality of optical fiber ribbons includes: a plurality of optical fibers arranged in parallel; and a tape material covering the plurality of optical fibers into a tape. The plurality of optical fibers are coated respectively with translucent color layers of different colors, and the tape material is made of a colorless and transparent material. In at least two of the plurality of optical fibers, markings for identifying the optical fiber ribbon are provided at a same position in the longitudinal direction of the optical fiber ribbon. The markings of each optical fiber ribbon differ from those of any other one of the optical fiber ribbons.

According to the present invention, it is easy to identify the optical fiber ribbons. Moreover, by changing the colors, arrangement, shapes, and the like due to the combinations of the color layers and the markings provided for the optical fibers, the types and number of optical fibers can be increased with the good identification being maintained. Furthermore, the markings are provided under the color layers, and the identification cannot be therefore damaged by deterioration over time. Still furthermore, since the markings have good visibility and distinguishability, the color of each optical fiber (the color of each color layer) can be easily identified. Still furthermore, even if the tape materials are removed from the optical fibers, the markings and color layers remain, and the optical fibers can be therefore easily identified.

DESCRIPTION OF THE PREFERRED EMBODIMENTS

Hereinafter, a description is given of an embodiment of the present invention based on the drawings.

<Optical Fiber Ribbon>

An optical fiber ribbon according to an embodiment includes a plurality of optical fibers which are arranged in parallel and joined to each other into a tape.

Figure 1:
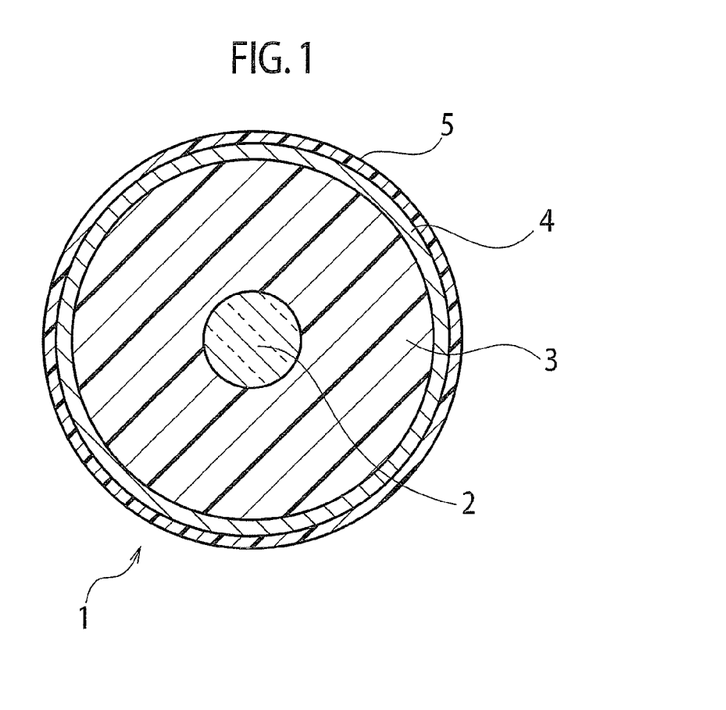
FIG. 1 is a cross-sectional view of an example of optical fibers constituting an optical fiber ribbon according to an embodiment of the present invention.

FIG. 1 is a cross-sectional view of an example of the optical fibers constituting the optical fiber ribbon according to the embodiment.

As shown in FIG. 1, each of optical fibers 1 constituting the optical fiber ribbon according to the embodiment includes a bare optical fiber 2, which is coated with a fiber coating 3. The bare optical fiber 2 is composed of a cladding and a core made of silica glass. The fiber coating 3 is made of an ultraviolet curing resin, for example. The optical fiber composed of the bare optical fiber 2 and the fiber coating 3 is also called as an optical fiber element. The fiber coating 3 may have a multilayer structure to constitute a so-called optical fiber core wire. In such a case, the outside of the aforementioned ultraviolet curing resin is further coated with thermoplastic resin, a different ultraviolet curing resin, or the like. On the outer surface of the fiber coating 3, a predetermined marking 4 is provided. Furthermore, the marking 4 is coated with a translucent color layer 5.

Figure 2:
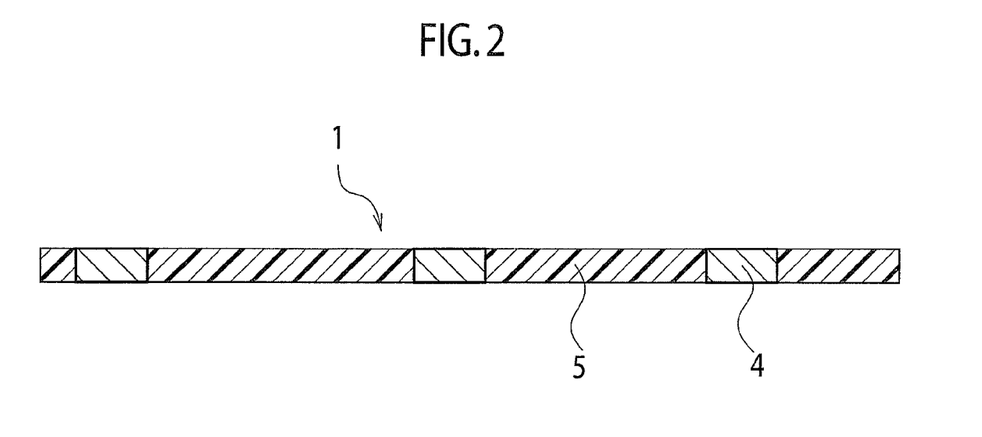
FIG. 2 is a plan view of the example of the optical fibers constituting the optical fiber ribbon according to the embodiment of the present invention.

FIG. 2 is a plan view of the example of the optical fiber constituting the optical fiber ribbon according to the embodiment.

As shown in FIG. 2, the marking 4 is provided at every predetermined distance in the longitudinal direction of the optical fiber. The markings 4 are colored in opaque color such as white having a good light reflectivity and are visible from the outside through the color layer 5. The color layers 5 of the optical fibers constituting an optical fiber ribbon (described later) are colored in different colors. The markings 4 may be colored in translucent color. In such a case, the markings 4 are colored in color darker than the color of the color layer 5 so as to be visible from the outside through the color layer 5.

Figure 3:
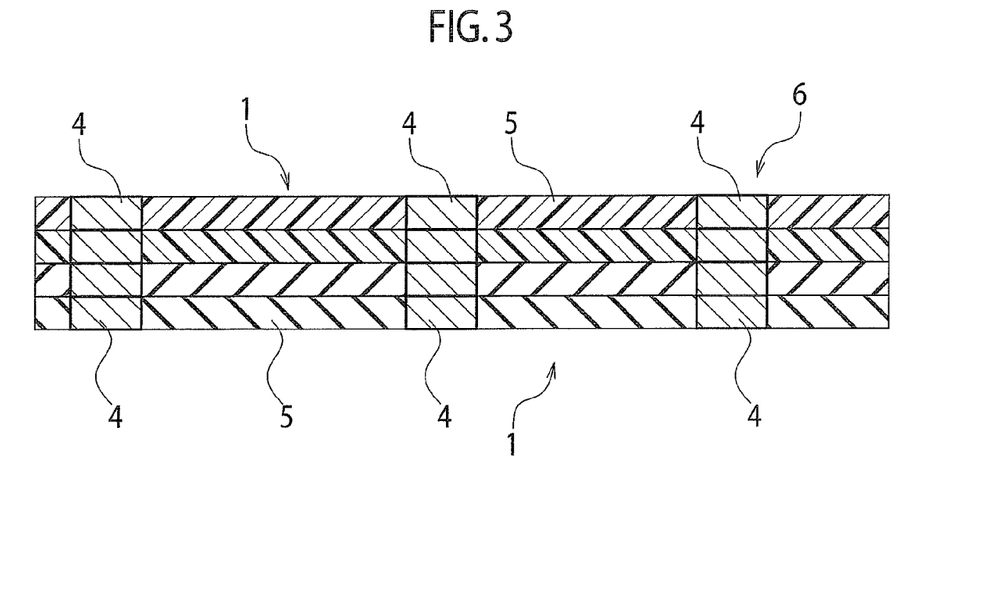
FIG. 3 is a plan view showing a configuration of the optical fiber ribbon according to the embodiment of the present invention.

FIG. 3 is a plan view showing a configuration of the optical fiber ribbon according to the embodiment.

As shown in FIG. 3, in the optical fiber ribbon according to the embodiment, a plurality of the optical fibers 1 are arranged in parallel and are coated with a tape material 6 into a tape. The tape material 6 is composed of a colorless transparent material.

In this optical fiber tape core, the same markings 4 are provided in at least two of the optical fibers 1. The markings 4 are markings for identifying the optical fiber ribbon and are provided at the same position in the longitudinal direction of the optical fiber ribbon. In other words, the markings 4 of the optical fibers 1 are arranged on a line in the width direction of the optical fiber ribbon.

In the optical fiber ribbon, the optical fiber ribbon can be identified according to the type of the markings 4. Moreover, each optical fiber 1 constituting the optical fiber ribbon can be identified by the color of the color layer 5.

Figure 4:
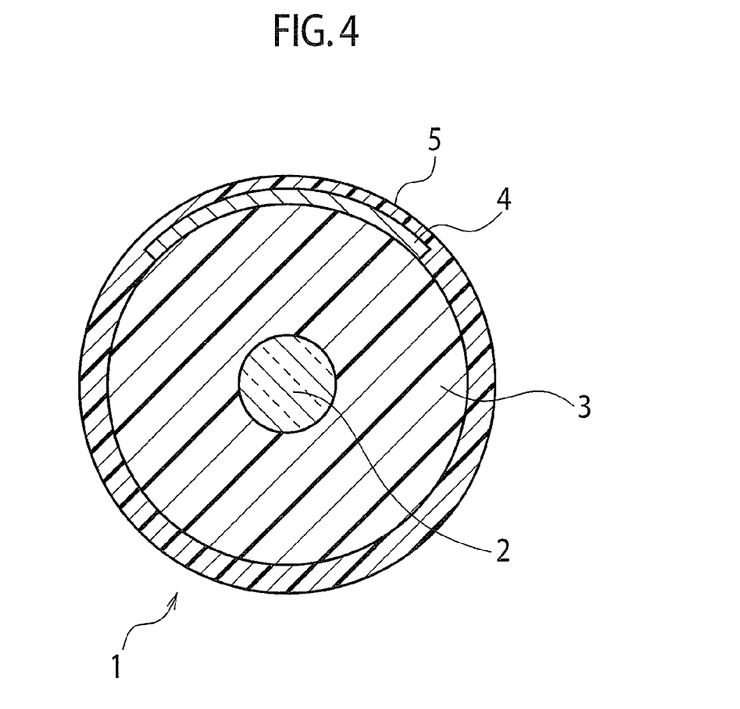
FIG. 4 is a cross-sectional view of another example of the optical fibers constituting the optical fiber ribbon according to the embodiment of the present invention.

FIG. 4 is a cross-sectional view of another example of the optical fibers constituting the optical fiber ribbon according to the embodiment.

As shown in FIG. 4, each marking 4 may be provided for only a part of the circumferential surface of the optical fiber 1.

<Optical Fiber Cable>

An optical fiber cable according to the embodiment includes a plurality of the aforementioned optical fiber ribbons, which are covered with a jacket made of a synthetic resin material.

Figure 5:
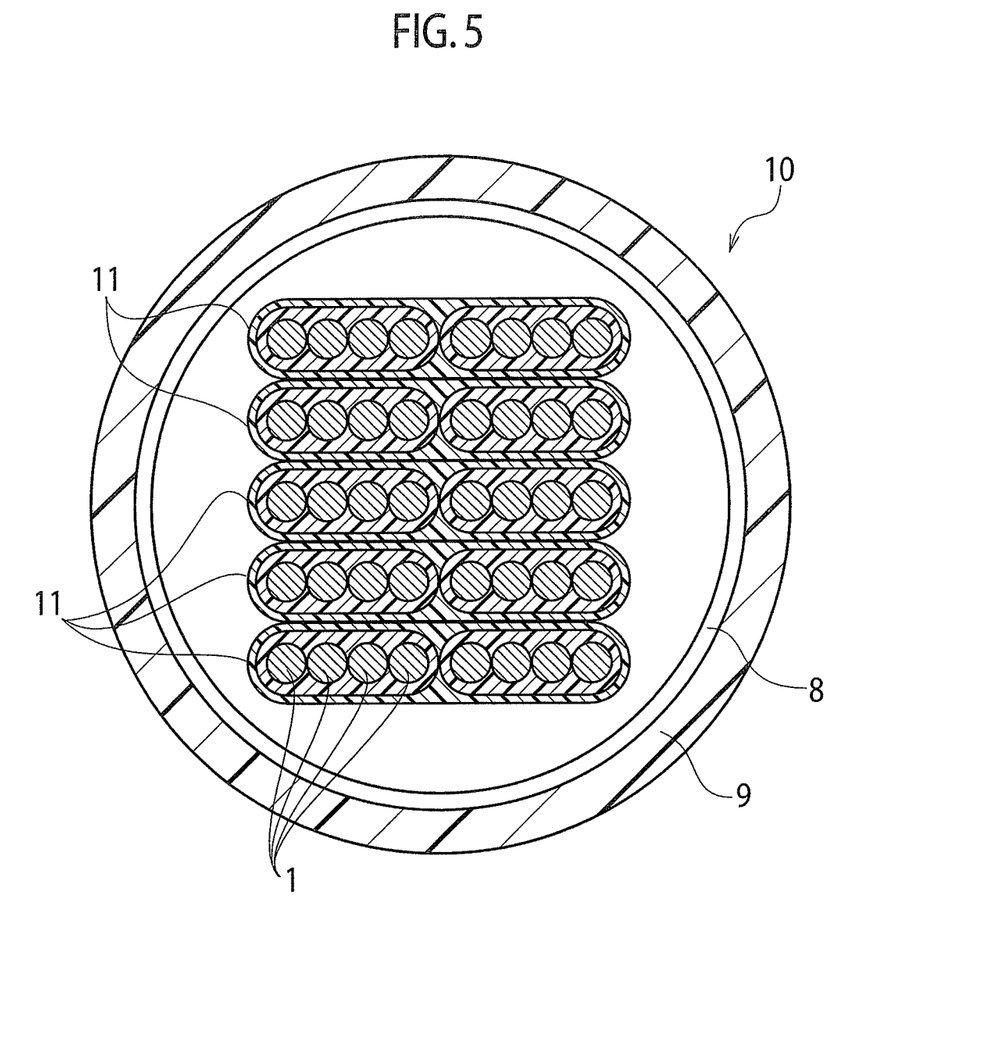
FIG. 5 is a cross-sectional view showing a configuration of the optical fiber cable according to the embodiment of the present invention.

FIG. 5 is a cross-sectional view showing a configuration of the optical fiber cable according to the embodiment.

As shown in FIG. 5, an optical fiber cable 10 according to the embodiment is a center-tube type optical fiber cable, for example. A plurality of optical fiber ribbons 11 are assembled and bundled to form a cable core. In the optical fiber cable 10, on the outer circumference of the plurality of optical fiber ribbons 11 assembled and bundled, a thermoplastic resin 8 is extruded into a tube shape. The outer circumference of the tube is sheathed with a jacket 9 of polyethylene or the like.

In each of the plurality of optical fiber ribbons 11 of the optical fiber cable 10, at least two of the optical fibers 1 constituting the optical fiber ribbon 11 are provided with the same markings 4 at the same position in the longitudinal direction of the optical fiber ribbons. Another optical fiber ribbon includes a different number of marks, for example. Based on such a difference in number of marks, the optical fiber ribbons can be distinguished.

EXAMPLES

Examples of Optical Fiber Ribbon

Figure 6:
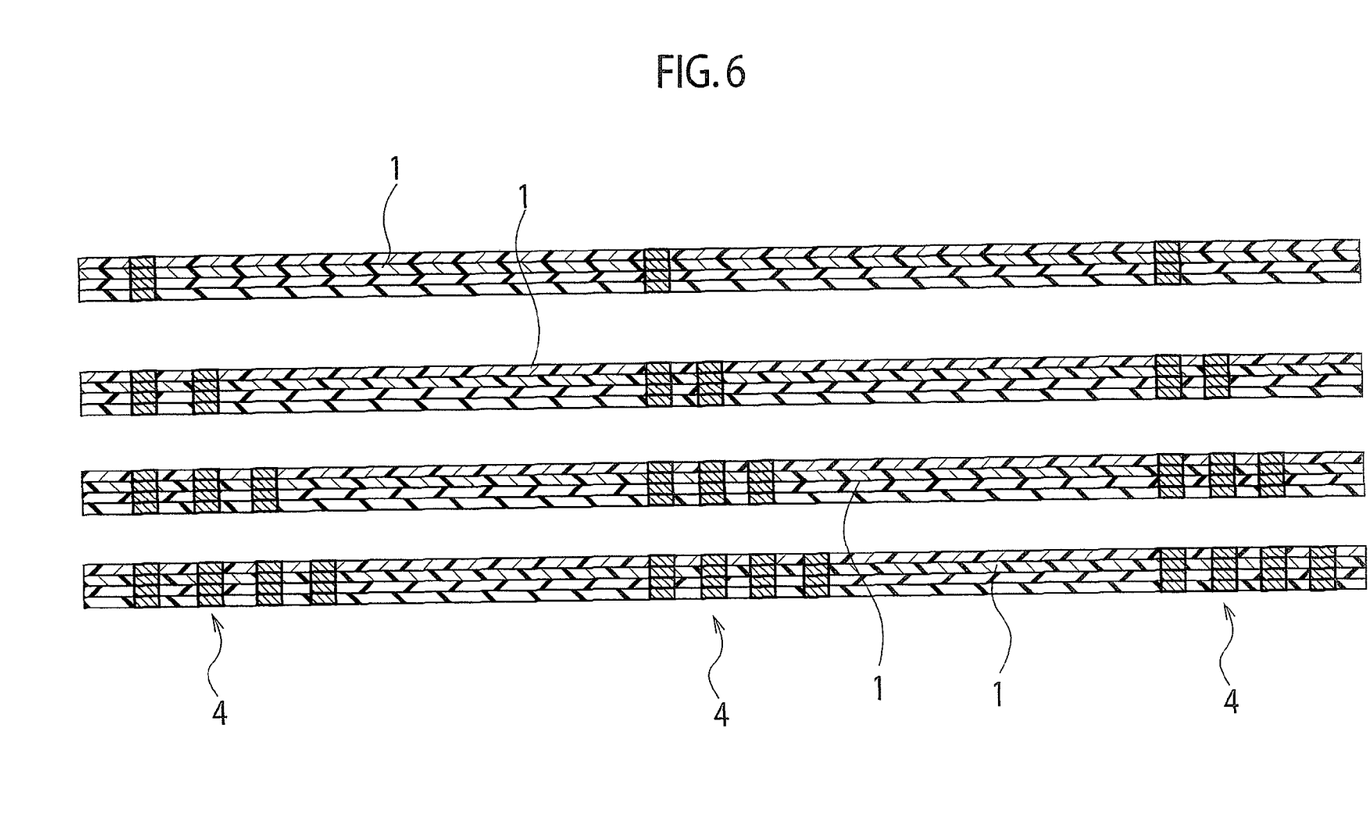
FIG. 6 is plan views showing configurations of Examples of the optical fiber ribbon according to the embodiment of the present invention.

FIG. 6 is plan views showing configurations of Examples of the optical fiber ribbon according to the embodiment.

As Examples of the optical fiber ribbon according to the embodiment, optical fiber ribbons were formed of the optical fibers 1 with an outer diameter of the fiber coating 3 of 250 microns. The markings 4 had a mark length of 2 mm and a mark pitch of 50 mm and were provided intermittently in the longitudinal direction. The markings 4 were coated with the color layers 5. Four optical fibers 1 were arranged side by side so that the longitudinal positions of the same markings 4 of all the optical fibers 1 correspond to each other.

The material of the tape material 6 is an ultraviolet curing resin. The optical fibers 1 were coated with the tape material 6 into a tape.

Figure 7:
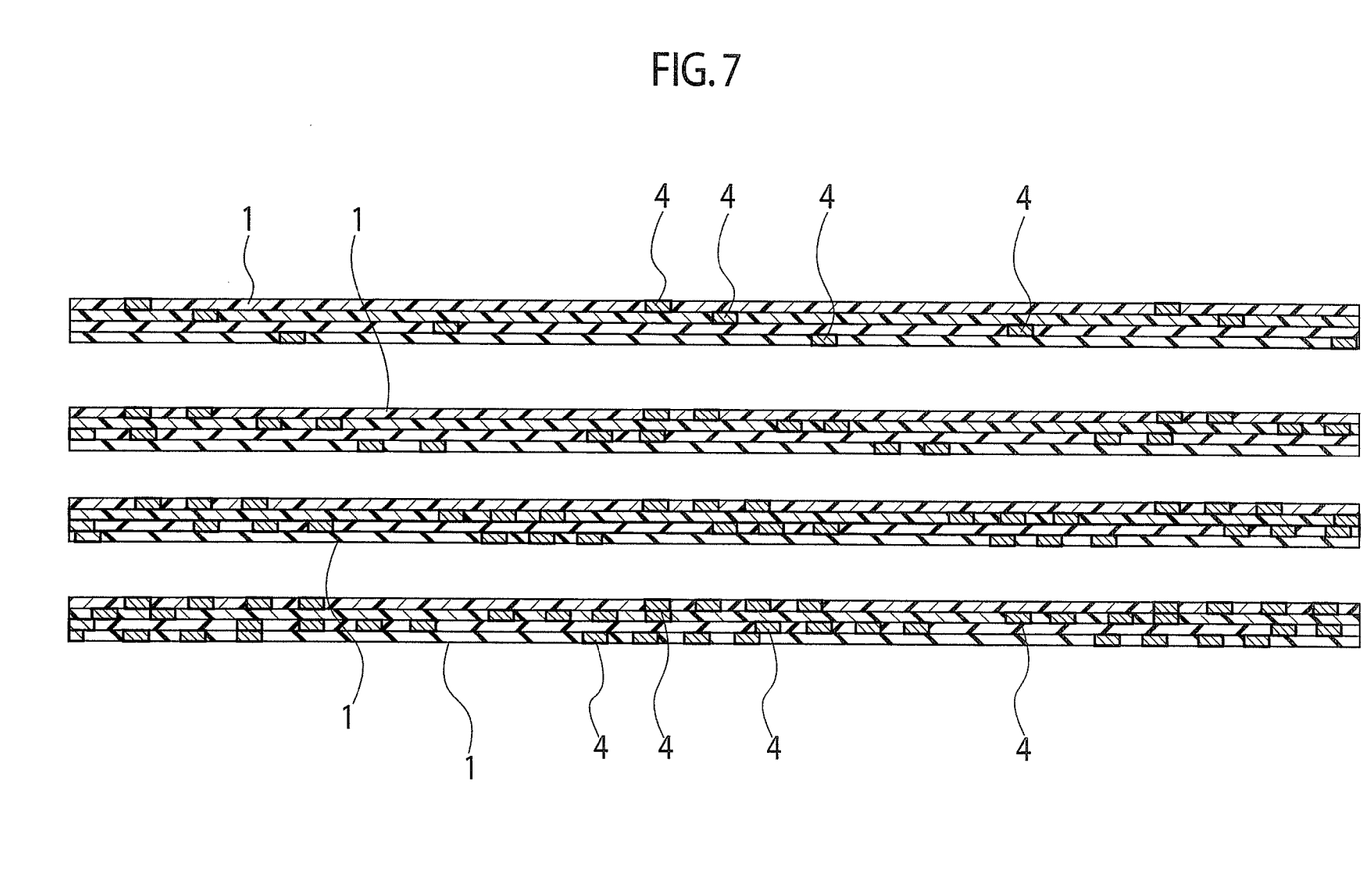
FIG. 7 is plan views showing configurations of Comparative Examples of the optical fiber ribbon.
Figure 8A:
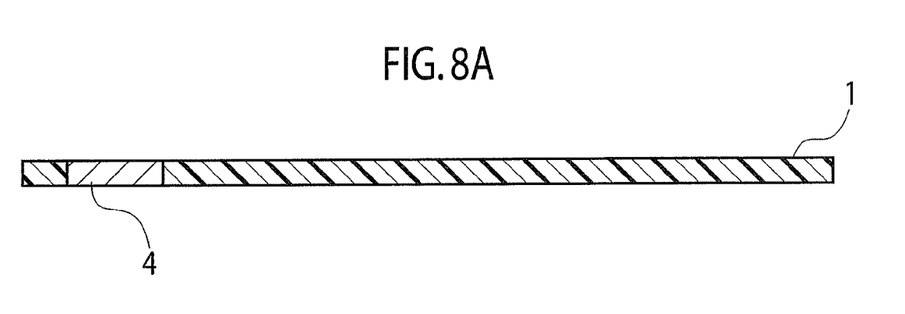
FIGS. 8A, 8B, 8C and 8D are plan views showing examples of the types of markings in Examples and Comparative Examples.
Figure 8B:
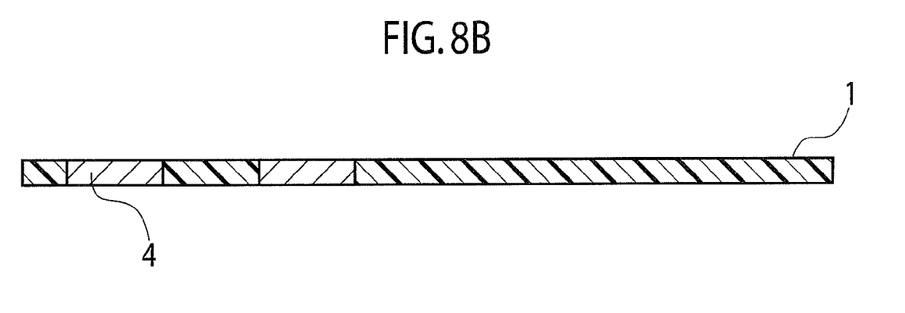
Figure 8C:
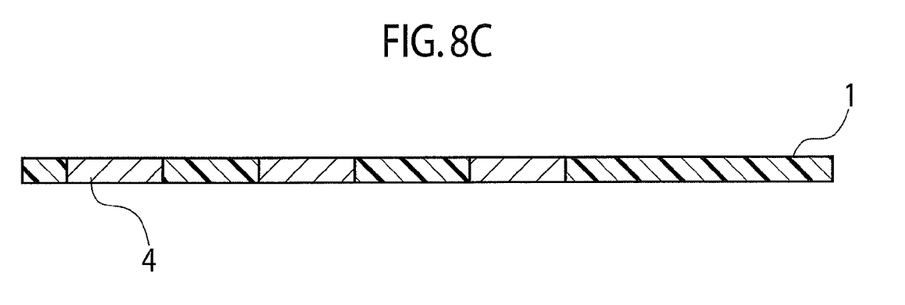
Figure 8D:
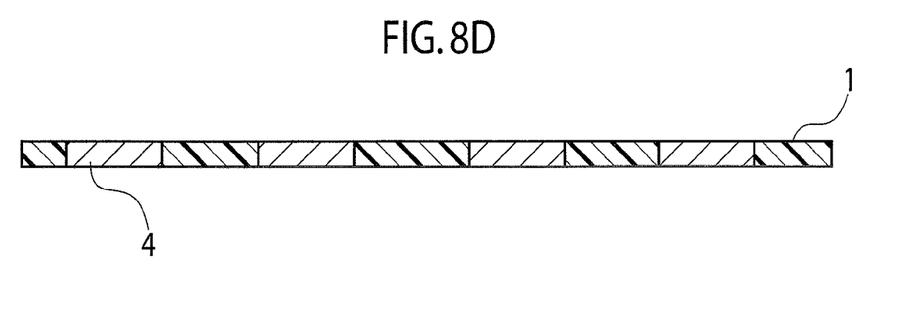

FIG. 7 is plan views showing configurations of Comparative Examples of the optical fiber ribbon.

As Comparative Examples, the same optical fibers as those of Examples were used to prepare optical fiber ribbons in which the longitudinal positions of the same markings 4 of all the optical fibers 1 did not correspond to each other as shown in FIG. 7.

FIGS. 8A, 8B, 8C and 8D are plan views showing the types of the markings of Examples and Comparative Examples.

These Examples and Comparative Examples included four types of markings 4 as shown in FIGS. 8A to 8D. The four types of markings 4 were: one 2 mm mark (see FIG. 8A), two consecutive 2 mm marks (see FIG. 8B), three consecutive 2 mm marks (see FIG. 8C), and four consecutive 2 mm marks (see FIG. 8D).

A comparison between the optical fiber ribbons of Examples and Comparative Examples was made in terms of identification of each optical fiber. It was then confirmed that identification of the markings 4 were extremely improved in the optical fiber ribbons of Examples, where the longitudinal positions of the markings 4 of all the optical fibers 1 corresponded to each other, compared with the optical fiber ribbons of Comparative Examples.

Moreover, it was confirmed that the markings 4 provided for the respective optical fibers 1 could be visually recognized well even when the optical fibers 1 were separated into single-core optical fibers. The optical fibers 1 separated into single-core optical fibers could be easily identified based on the combinations of the markings 4 and the colors of the color layers 5.

As for the markings, as shown in FIG. 4 described above, even when each marking was provided for only a part of the outer circumference of the optical fiber 1, it was confirmed that the identification of the markings 4 could be extremely improved compared with the optical fiber ribbons of Comparative Examples.

The combinations of the colors of the color layers 5 and the markings 4 can include various types and are not particularly limited. For example, the optical fibers 1 whose color layers 5 are blue and yellow may be provided with the markings 4 while the optical fibers 1 whose color layers 5 are green and red are not provided with the markings 4. Alternatively, the optical fibers 1 whose color layers 5 are blue and green may be provided with the markings 4 while the optical fibers 1 whose color layers 5 are yellow and red are not provided with the markings 4. Furthermore, the optical fibers 1 whose color layers 5 are blue and red may be provided with the markings 4 while the optical fibers 1 whose color layers 5 are yellow and green are not provided with the markings 4. In such a manner, the colors of the color layers 5 and the markings 4 can be variously combined.

Moreover, the number of optical fibers is not limited to four shown in Examples and may be any number.

Examples of Optical Fiber Cable (1) SZ-type Optical Fiber Cable

In this Example, 100-core SZ-type optical fiber cables were prepared. An SZ-type optical fiber cable includes: a core including slots on the outer circumference, the slots being repeatedly inverted right and left; optical fiber ribbons accommodated in the slots of the core; and a sheath covering the cores and optical fiber ribbons. In this Example, the core included five slots, and the slots accommodated five four-core tape core wires. The optical fiber ribbons were four-core optical fiber ribbons shown in FIGS. 6 and 7.

For each of the optical fiber ribbons, one to five marks according to the embodiment are repeatedly provided. The number of marks varies according to the numbers assigned to the optical fiber ribbons. For example, for the optical fiber ribbon assigned as the first optical fiber ribbon, the markings 4 including one mark are provided at every predetermined distance along the longitudinal direction of the optical fiber ribbon.

These optical fiber cables were used to make comparison of identification. It was confirmed that the five optical fiber ribbons taken out from the slots were identified corresponding to each assigned number. In the comparison of the identification, in addition to the optical fiber cables of Examples, the confirmation was also made for the optical fiber cables composed of optical fiber ribbons which employed the tracer method as a conventionally-used method to identify optical fiber ribbons for comparison.

The tracer method is the identification method using an optical fiber of a color different from the tracers of the other optical fiber ribbons. The tracer method is generally used to identify optical fiber ribbons. For example, the typical tracer method uses four-core optical fiber ribbons each including an optical fiber used as a tracer and white, brown, and grey optical fibers, which are arranged side by side. The colors of the tracers of the first to fifth optical fiber ribbons are set different to blue, yellow, green, red, and violet for identification. Each of the optical fiber ribbons commonly includes the white, brown, and grey optical fibers and is identified by only the color of the tracer. Accordingly, it is necessary to confirm the color of the tracer instead of the entire optical fiber ribbons. In other words, it is necessary to identify the color of the optical fiber as the tracer among the four thin optical fibers arranged side by side.

In a comparison between the optical fiber cable including the optical fiber ribbons shown in FIG. 6 and the optical fiber cable including the optical fiber ribbons shown in FIG. 7, the visibility was much better in the case of using the optical fiber ribbons according to the embodiment shown in FIG. 6 than the case of using the optical fiber ribbons (shown in FIG. 7) in which the positions of the markings 4 are irregular. In the case of using the optical fiber ribbons shown in FIG. 7, in order to identify the optical fiber ribbons similar in number of markings (for example, optical fiber ribbons with the markings 4 of three and four marks), it is necessary to carefully identify the optical fibers provided with the marks one by one. On the other hand, in the case of using the optical fiber ribbons shown in FIG. 6, the marks are aligned at regular positions, and it is possible to distinguish the optical fiber ribbons, which are assemblies of the optical fibers, at a glance without carefully observing the optical fibers one by one. It was thus confirmed that the optical fiber ribbons of Examples were well identified.

By a comparison with conventional optical fiber ribbons including optical fibers as tracers, it was confirmed that better identification was provided in the case of using the optical fiber ribbons shown in FIG. 6. Specifically, as for the aforementioned conventional optical fiber ribbons, it is necessary to specify the colors of the optical fibers as the tracers, and it is necessary to carefully observe the color of one of the optical fibers. However, in the case of using the optical fiber ribbons shown in FIG. 6, as described above, the identification of the optical fiber ribbons can be made on a core wire-by-core wire basis. Accordingly, the optical fiber ribbons according to the embodiment can be identified more easily than the tracer-type optical fiber ribbons.

(2) Center-tube Optical Fiber Cable

In this example, center-tube optical fiber cables were prepared.

A center-tube optical fiber cable is a cable which includes a space on a central axis of the cable to accommodate the optical fiber ribbons, intervening members, and the like and is covered with a sheath around. In such a cable, the accommodation space accommodates several to more than ten, or more than 20 optical fibers or optical fiber ribbons. This embodiment is effective on identifying an arbitrary optical fiber ribbon among a number of optical fiber ribbons of such a cable structure.

The prepared center-tube optical fiber cable produced was a 48-core optical fiber cable which accommodated 12 four-core optical fiber ribbons in the accommodation space on the central axis. As shown in FIG. 6, each optical fiber ribbon was provided with one to twelve markings 4 aligned in the width direction. In comparison, optical fiber cables including optical fiber ribbons of the tracer method type were prepared for comparison of identification of the optical fiber ribbons. In the tracer method, similar to Example of the SZ optical fiber cable, the colors of the tracers needed to be individually determined, and moreover, twelve tracer colors were required. The optical fibers had a number of colors, and it is therefore difficult to distinguish red and pink or red and orange, which are the same type of color, for example. In this Example, accordingly, use of the optical fiber ribbons according to the embodiment could provide better identification.

(3) Application to Optical Fiber Coupler

The optical fiber ribbon according to the embodiment is effective on easily distinguishing a plurality of optical fiber ribbons of various types of cables in addition to optical fiber cables.

As Examples, optical fiber couplers simultaneously connecting plural optical fiber ribbons were prepared using the optical fiber ribbons shown in FIG. 6. In this case, similar to the application to optical fiber cables, the optical fiber ribbons could be well identified, and the workability was improved. Such optical fiber couplers are included in closures, optical termination boxes, optical termination cabinets, and the like. Also when such an optical fiber coupler is accommodated in an optical termination box or a closure using a splitter unit, the optical fiber ribbons are well identified, and the workability can be improved.

According to the optical fiber ribbon, optical fiber cable, and wire configuration of the embodiment, a number of types of optical fiber ribbons are easily identified. Moreover, changing the colors, arrangements, shape, and the like based on the combinations of the color layers provided for the optical fibers and the markings can increase the types and number of optical fibers with the good identification being maintained. Furthermore, since the markings are provided under the color layers, the identification is not damaged due to deterioration over time. The visibility and distinguishability of the markings are good, and the colors of the optical fibers themselves (the colors of the color layers) can be identified easily. Still furthermore, even if the tape material is removed, the markings and color layers remain, and the optical fibers can be easily identified.

What is claimed is:

1. An optical fiber cable, comprising:
a plurality of optical fiber ribbons, wherein
each of the plurality of optical fiber ribbons includes:
   a plurality of optical fibers arranged in parallel; and
   a tape material covering the plurality of optical fibers into a tape, wherein the plurality of optical fibers are coated respectively with translucent color layers of different colors,
the tape material is made of a colorless and transparent material,
at least two of the plurality of optical fibers include the same markings provided under the translucent layers for identifying the optical fiber ribbon, each of the markings including at least one mark extending in a width direction of the optical fiber ribbon perpendicular to a longitudinal direction of the optical fiber ribbon,
the markings are intermittently arranged in the longitudinal direction of the optical fiber ribbon, and
longitudinal positions of the markings provided in said at least two of the plurality of optical fibers correspond to each other, and wherein
a number of marks in the markings of different optical fiber ribbons differs from one another.

2. A wire configuration of a plurality of optical fiber ribbons, comprising
a plurality of optical fiber ribbons, wherein
each of the plurality of optical fiber ribbons includes:
   a plurality of optical fibers arranged in parallel; and
   a tape material covering the plurality of optical fibers into a tape, and
the plurality of optical fibers are coated respectively with translucent color layers of different colors,
the tape material is made of a colorless and transparent material,
at least two of the plurality of optical fibers include the same markings provided under the translucent layers for identifying the optical fiber ribbon, each of the markings including at least one mark extending in a width direction of the optical fiber ribbon perpendicular to a longitudinal direction of the optical fiber ribbon,
the markings are intermittently arranged in the longitudinal direction of the optical fiber ribbon, and
longitudinal positions of the markings provided in said at least two of the plurality of optical fibers correspond to each other, and wherein
a number of marks in the markings of different optical fiber ribbons differs from one another.

* * * * *